Patented Oct. 18, 1949

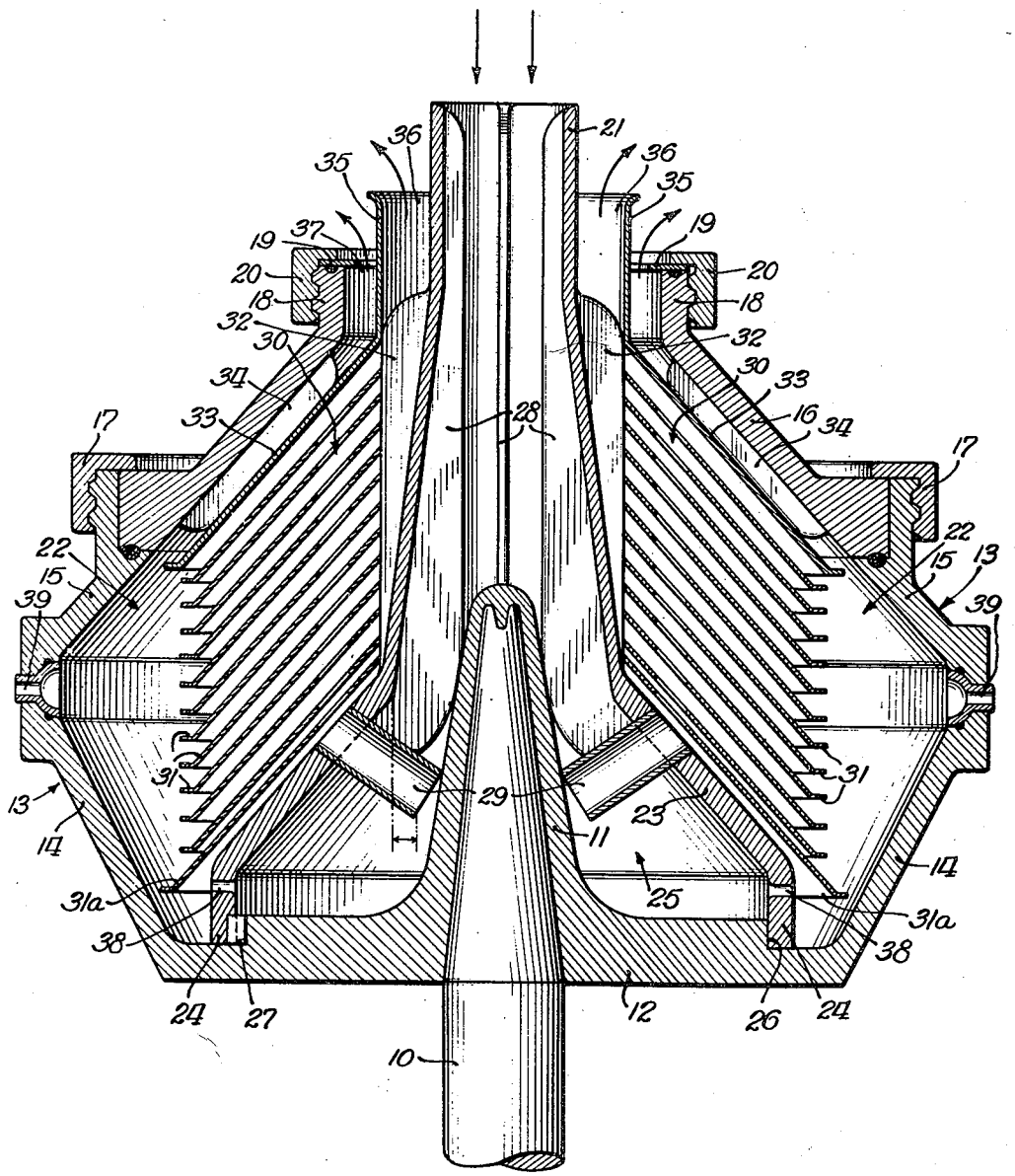

2,485,209

UNITED STATES PATENT OFFICE 2,485,209

CENTRIFUGE WITH PRIMARY AND SECONDARY ZONES OF SEPARATION AND PROCESS THEREFOR

Ingie J. Lundal, Chicago, Ill., assignor, by direct and mesne assignments, to Sugar Creek Creamery Company, Danville, Ill., a corporation of Delaware, and Cherry-Burrell Corporation, Chicago, Ill., a corporation of Delaware, as joint owners Application July 16, 1943, Serial No. 494,965

22 Claims. (Cl. 233—27)

This invention relates to centrifugal devices and processes. More particularly, this invention relates to improvements in centrifugal devices and processes for the separation and concentration of various separable fractions of liquids, such, for example, as the separable fractions of sour cream, i. e., concentrated butter fat, skim-milk and coagulated protein.

In the separation and concentration of cream, particularly sour cream, through the use of the conventional type of centrifugal cream separator, the efficiency of the separator is generally impaired by the accumulation within the various portions of the centrifugal rotary separator elements of sufficient quantities of coagulated protein and entrapped extraneous matter, including the products of neutralization, to bring about a restriction of the free flow of the liquids through the separation device, resulting in the decreased operating efficiency. Such accumulation of coagulated proteins and entrapped entraneous matter is most commonly found intermediate the separating or stratifying disks and in the outer peripheral portions of the centrifugal rotor. These accumulations may, if the separation process continues for a sufficient period of time, completely obstruct the flow of liquid through the separating device, necessitating the discontinuance of the operation and cleaning of the separator.

In the conventional cream separator of the centrifugal bowl or rotar type, the milk or cream to be separated is normally introduced into the bowl through an infeed or primary centrifugal separation chamber in which the milk or cream is subjected to primary centrifugal separation. The milk or cream is normally discharged from the primary separation chamber into a final centrifugal separation chamber in which it is most commonly divided into laminae intermediate a suitable number of stratifying or separating disks. Substantially all of the final separation of butter fat or concentrated cream from the milk or diluted cream and the concentration of the butter fat take place in the laminar divisions of the milk or cream. The separated and concentrated cream or butter fat and the skim-milk are normally discharged separately from the final separation chamber through axial overflow ducts extending through the upper wall of the outer centrifugal rotor, from which ducts the concentrated butter fat and skim-milk are normally discharged into appropriate collectors.

In the normal operation of the conventional type of centrifugal milk or cream separator and concentrator for the separation of sour cream, all of the product to be separated or concentrated, together with any extraneous foreign matter, as well as coagulated protein which is commonly found in sour cream, is discharged from the infeed or primary separation chamber into the laminar spaces intermediate the stratifying or separating disks in the outer centrifugal or final separation chamber. The separated extraneous matter and concentrated coagulated protein commonly accumulates in the outer peripheral spaces of the primary separation chamber and in-between the stratifying disks from which it is normally not removable during the operation of the separating and concentrating device.

The rotation of the primary and secondary centrifugal separating chambers brings about the separation and concentration of the butter fat from the skim-milk and coagulated protein and other heavier extraneous matters. The skim-milk and coagulated protein and other heavier extraneous matters pass outwardly through-between the stratifying disks to the outer peripheral portions of the final or secondary separating chamber while the concentrated cream or butter fat passes inwardly between the stratifying disks toward the axis of rotation.

Foreign matters, such as are commonly found in milk or sour cream, particularly coagulated proteins, have a tendency to adhere to and accumulate upon the surfaces of the stratifying disks and, after a short period of operation of the centrifugal separator, also to completely obstruct the flow through the spaces intermediate the stratifying disks of the liquid to be separated and concentrated. In certain instances these accumulations also obstruct the flow of the product in the outer peripheral portions of the final separation chamber. When either of such obstructions occurs it is necessary to discontinue the separation operation, disassemble the separating device and remove the accumulations of coagulated proteins and foreign matters from the obstructed flow spaces.

The primary objects of the present invention are, therefore, to provide novel and inexpensive improvements in a centrifugal separator and concentrator, together with novel improvements in the process of centrifugally separating and concentrating separable fractions of liquids, whereby the accumulation of material within the centrifugal separating device is prevented. More particularly, the objects of the present invention, as applied to the preferred embodiment and method of operation thereof, are to provide a device and process in which the free flow through the centrifugal separator of the liquid, such as cream, being separated and concentrated is not obstructed by the accumulation of materials, such as coagulated proteins and other extraneous matters, and the overall efficiency of the operation of the separating device is improved.

The objects of the present invention with respect to the centrifugal separating device, as illustrated in the drawing, relate to the provision of improvements for the free passage of concentrated flow obstructing materials, such as coagulated protein and other foreign matter, from the primary separating chamber into the outer and final or secondary separating chamber and the discharge of such materials from the separating chambers without impairing the efficiency of the device in the separation of liquids, such as, for example, the separation of butter fat from skim-milk and in the concentration of the separated butter fat.

The foregoing and other objects of the present invention will become more apparent as the nature of the invention is hereinafter more fully explained. The preferred embodiment of the structural features of the present invention and the details of the improved process and method of operation will be best understood from the following description when read in connection with the accompanying drawing. In the drawing there is shown a vertical cross sectional view of an improved centrifugal cream separator and concentrator embodying the structural improvements according to the present invention and adapted for use in the practice of the improved process.

In the drawing, in which like numerals are used to identify like elements, 10 represents a support and drive shaft driven by any suitable source of power (not shown). Shaft 10 has a tapered end for extension into a complementary and substantially conical hollow spindle 11 formed integrally with the lower wall 12 of the outer centrifugal separator rotor or bowl 13 which is supported by and nicely balanced upon and driven by the shaft 10 through a suitable driving connection of conventional design.

The outer wall of the centrifugal bowl or rotor 13, the maximum diameter of which is approximately centrally thereof, i. e., approximately midway between its upper and lower extremities is formed of opposed frusto-conical surfaces 14 and 15. The upper wall of the outer rotor 13 consists of a frusto-conical section 16 preferably secured to the wall portion 15 by a screw-threaded coupling 17 of suitable design. The upper wall 16 is provided with an annular upwardly extending neck 18 which is partially closed by a ring dam 19 secured thereto by a screw coupling 20.

Extending downwardly through the neck 18 and co-axially with the outer bowl 13 there is provided a hollow centrally positioned infeed tube 21 having a downwardly and outwardly expanded wall. The expanded wall 21, at approximately the mid-portion of the outer and final or secondary separation chamber 22 which is defined by the walls of the rotor 13, joins a frusto-conical wall section 23 at the lower end of the tube 21 and preferably formed of an expanded portion of the lower end of the tube 21 to thereby define a first of primary separation chamber. Wall section 23, together with an integrally formed flange 24 and the lower wall 12 of the outer rotor 13, more specifically stated define the outer wall of a primary or first separation chamber 25. The outer peripheral wall of the secondary separation chamber 22 surrounds the primary separation chamber 25 and extends substantially beyond the outer periphery of the primary separation chamber 25.

The combined hollow infeed tube 21 and the expanded wall 23 are seated by means of the ring flange 24 on the lower wall 12 of the outer rotor 13 and are maintained in spaced co-axial position by the ledge 26 in the lower wall 12, which ledge is telescoped into flange 24. The infeed tube 21 and the wall 23 are rotated co-axially with the outer rotor 13 by means of the driving key 27 appropriately interposed between the flange 24 and the ledge 26.

Formed integrally with the inner wall of the infeed tube 21 and extending lengthwise and inwardly thereof in a radial direction there are provided a number of guide and slippage preventing vanes 28. The vanes 28, preferably four in number and equally spaced about the inner wall of the tube 21, extend downwardly therein to a similar number of similarly spaced discharge tubes 29 in the primary separation chamber 25. Tubes 29 are supported directly below the vanes 28 within and sealed to openings in the upper portion of the frusto-conical wall 23 of the primary separation chamber 25.

The tubes 29 extend inwardly and downwardly toward the central portion of the primary separation chamber to afford a passage means for the escape of the lighter fractions of primarily separated material from within the primary separation chamber 25 to an intermediate zone of the secondary separation chamber 22. Such intermediate zone comprises in substance the "neutral zones" of the final separation chamber in the preferred embodiment of this invention. The inward extension of tubes 29 is such as to prevent the primarily separated and partially concentrated heavier fractions of the primarily separated material from escaping from the chamber 25 through the tubes 29 with the lighter fractions of the primarily separated material. Such escape is prevented by extending the tubes 29 inwardly from the outer peripheral wall 23 a sufficent distance so that the inner ends of the tubes 29 extend through the layer of primarily concentrated heavy fraction of material, such as coagulated protein in the instance of sour cream, which separates out from the remaining liquid in the primary separation chamber and normally, due to centrifugal force, tends to cling to the outer peripheral wall 23. In the preferred embodiment of this invention the tubes 29 extend through the wall 23 to a point within the primary separation chamber 25 located a distance from the axis of the tube 21 less than the length of the radius of the tube 21 immediately above the primary separation chamber 25.

The materials flowing through the passage tubes 29 are discharged into the outer centrifugal chamber 22 through the passages 30 formed by alined openings in the frusto-conical stratifying and separating disks 31. The disks 31 are maintained in radial alinement by the slippage preventing and spacing vanes 32 formed on the outer periphery of the tube 21. The disks 31 are supported in spaced relation in the conventional manner upon the outer surface of the frusto-conical wall 23 of the primary separation chamber 25.

The passages 30 are spaced from the axis of rotation of the primary and secondary separation chambers 25 and 22 a radial distance approximately equal to the radial depth of the lightest fraction of the final separation within the outer and final separation chamber 22. In the practice of the invention as contemplated in its preferred form, such lightest fraction of separation would consist of concentrated butter fat. The outer surface of the layer of concentrated butter fat within the final separation chamber 22 in a centrifugal separation device, as illustrated in the accompanying drawing, would commonly be referred to as the "neutral zone" of the separating device.

The disks 31 are locked in operative position by a frusto-conical dividing wall 33 formed similarly to the disks 31 but devoid of the openings which in the disks 31 form the passages 30. The dividing wall 33 extends outwardly radially slightly beyond the outer periphery of the disks 31. Similar to the disks 31 the dividing wall 33 is maintained in position by the vanes 32 and compressed against the stacked disks 31 by the slippage preventing and compression vanes 34 depending from the inner surface of the upper wall 16 of the outer rotor 13.

Formed integrally with the dividing wall 33 and defining the upper restricted opening therein, there is provided an upwardly extending tubular element 35. The element 35 extends upwardly beyond the ring dam 19 and intermediate the ring dam 19 and the infeed tube 21, thereby forming with these elements the inner and outer annular passages 36 and 37 for the discharge of the lightest and intermediate fractions of the secondary or final separation. These lightest and intermediate fractions of final separation in the practice of the invention in the separation of sour cream would consist of concentrated butter fat and skim-milk.

The relative proportions as to height and diameter of the tubular neck 18, tubular element 35 and the ring dam 19 which form the discharge passages 36 and 37 are such as to secure the appropriate static heads of the separated materials being discharged from the separating device through passages 36 and 37. The relation of the various proportions of the elements of the separating device one to another is, of course, in keeping with the conventional design and established theories.

In the outer peripheral wall of the primary separating chamber 25 and radially beyond the "neutral zone" of the secondary separation chamber 22, there are provided ports or passages 38 for the separate passage of the partially concentrated heaviest fraction of the primarily separated material to the outer zone of the secondary separation chamber 22. In the instance of the separation of sour cream such material consists primarily of coagulated protein. Such material passes out of the primary separation chamber 25 through the passages 38 directly into the outer zone of the secondary or final separation chamber 22, which outer zone is spaced outwardly of the neutral zone of the chamber 22, without passing through the ducts 29, through which ducts the remainder of the separation products flows into the laminar spaces defined by the stratifying disks 31.

The flow of the primarily concentrated heaviest fraction of separation from the ports 38 toward the outer inclined wall 14 of the outer zone of the secondary separation chamber 22 is somewhat obstructed in the preferred embodiment of this invention by the outer edge of the lowest stratifying disk 31a which extends outwardly beyond the outer edges of the remainder of the stratifying disks 31 and which overhangs the ports 38. The obstruction to the flow of the primarily concentrated heaviest fraction of separation permits some of the entrained lighter materials, such as butter fat in the instance of the separation of sour cream, to escape therefrom and travel upwardly and inwardly toward the axis of rotation.

To permit the discharge of the concentrated heaviest fraction of separation from the outer centrifugal rotor 13 there are provided discharge ports 39. The discharge ports 39 may be formed in any suitable fashion. In the preferred embodiment, as illustrated in the drawing, the discharge ports 39 have been formed by hollow removable studs, each closely fitted into an opening in the outer periphery of the rotor 13 at its greatest diameter. The studs 13 are provided with suitably enlarged heads on their inner ends to thereby maintain them in proper operative position. The provision of the ports 39 in such removable studs enables the ready exchange of one set of discharge port studs for another set of studs having either larger or smaller discharge ports 39 as may be required in view of the capacity of the centrifugal separating device.

In the preferred embodiment of the invention there are four passages 29, four ports 38 and four ports 39. The passages 29 and the ports 38 and 39 are symmetrically arranged circumferentially of the separating device and positioned at the greatest possible angular rotation with respect to one another. In the drawing and for the purpose of clarity of illustration only, the passages 29, ports 38 and the ports 39 have all been shown as being co-planar.

The ports 38 need only be of sufficient diameter to permit the ready flow of the primarily concentrated heavy fraction of separation from the primary separation chamber 25 into the final separation chamber 22. However, due to the fact that the outer peripheral portion of the final separation chamber 22 is normally filled with the intermediate fractions of separation, which, in the preferred practice of the improved process, would consist of skim-milk, and, in view of the fact that in the preferred embodiment the ports 38 are positioned outwardly beyond the "neutral zone," there is no appreciable tendency of the lighter and intermediate fractions of primary separation to flow from the primary separation chamber 25 through the ports 38 into the final separation chamber 22. For this reason the provision of the ports 38 will not interfere with or decrease the efficiency of the separation and concentration of the lightest and intermediate fractions of separation which normally take place in-between the separation of the stratifying disks 31.

The ports 39 are, however, preferably only of such a total capacity as to permit the flow only of the finally concentrated heaviest fraction of separation and entrained foreign matter, together with sufficient quantities of the intermediate fractions of separation, and as to maintain the free discharge of the heavy concentrated material through the ports 39. The ports 39 should, however, not be of such a capacity as to permit the lowering of the level of the liquid in the discharge passage 37 below the ring dam 19.

It should be understood that the improved separator and concentrator according to the present invention may be embodied in various structural modifications from that shown in the drawing. The preferred embodiment has been described as a cream separator and concentrator. Likewise the improved process, which has been referred to as a milk or cream separation and concentration process, may also be practiced in connection with the separation of various other liquids. The improved process will be described in connection with the separation and concentration of sour cream containing coagulated proteins and the products of neutralization of acids normally present in the sour cream.

In the separation of sour cream in a device as shown in the drawing, the cream is supplied to the mouth of the infeed tube 21 and flows downwardly therethrough in engagement with the rapidly rotating vanes 28. The vanes 28 cause the cream to rotate with the infeed tube 21, thereby commencing the centrifugal separation and concentration of the readily separable heavy fraction of separation, i. e., the coagulated proteins and semi-solid heavy products of neutralization, as well as undissolved neutralizing materials, present in the sour neutralized cream.

The coagulated proteins, the heavier products of neutralization and in some instances undissolved neutralizing materials commence to concentrate along the inner surface of the wall of the infeed tube 21 and pass downwardly into the primary separation chamber 25 in the form of a layer in close proximity to the inner surface of the wall 23 of the chamber 25. This layer of heavy materials, i. e., coagulated proteins and extraneous matters, concentrates in the outer peripheral portions of the primary separation chamber 25. The lighter fractions of the primary separated sour cream within the chamber 25 are forced inwardly and flow toward the central portion of the chamber 25 more remote from the wall 23 than the layer of partially concentrated and coagulated proteins and products of neutralization.

The lighter fractions of the previously separated sour cream, which consist primarily of butter fat, skim-milk and unseparated coagulated proteins, pass from the chamber 25 through the passages 29 into the passages 30 from which they are distributed into the laminar spaces intermediate the stratifying disks 31. The drawing clearly indicates that the aligned groups of passages 30 are each positioned above the discharge end of an associated passage 29. In the laminar spaces intermediate the disks 31 the butter fat or lightest fraction of separation is concentrated and separated from the skim-milk or intermediate fraction of separation. The skim-milk, together with any unseparated coagulated protein which is heavier than the separated butter fat, flows outwardly through-between the disks 31 into the outer peripheral portion of the outer and final separation chamber 22. The concentrated butter fat is forced upwardly and inwardly through-between the disks 31 toward the axis of rotation and into the cream discharge passage 36.

The concentrated cream or butter fat, just as in the conventional cream separator, rises in the cream flow space along the outer surface of the infeed tube 21 into the dividing tube 35, to be discharged through the cream discharge passage 36 by overflowing the upper edge of the tube 35. The greater portion of the skim-milk flows from the outer portion of the rotary chamber 22 through-between the dividing wall 33 and the upper wall 16 of the outer rotor 13 into the skim-milk discharge passage 37 formed between the tube 35 and the neck 18 of the outer wall 16 and is discharged over the ring dam 19.

Substantially all coagulated protein or other heavy extraneous foreign matter which was not primarily separated in the primary separation chamber 25 will be separated in the final separation chamber 22 and flow outwardly to the outer peripheral portions of the secondary separation chamber 22 farthest removed from the axis of rotation. It should, however, be noted that the great majority of the heaviest fraction of separation, which in the case of sour cream consists of coagulated proteins and the heavy products of neutralization, is primarily separated from the remainder of the cream in the primary separation chamber 25.

The primarily concentrated coagulated protein and other heavy products of primary separation are separately discharged from the primary separation chamber 25 through the ports 38 and pass thence into the extreme outer peripheral portion of the outer and secondary or final separation chamber 22, flowing along the wall 14 thereof. These heaviest concentrated fractions of separation are discharged, together with some skim-milk, through the ports 39 in the wall of the outer centrifugal rotor 13.

As has been hereinbefore described, the present invention provides simple, inexpensive and efficient improvements in a centrifugal separating and concentrating device, as well as improvements in the process for centrifugal separation and concentration whereby such products as sour cream and other like products which contain materials tending to clog flow passages within the device may be efficiently separated without the necessity of frequently discontinuing the separation or concentration operation and removing the accumulated materials from within the separating device.

The invention is hereby claimed as follows:

1. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, and a second passage extending from within said primary separation chamber to an intermediate zone of said final separation chamber.

2. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, and a second passage extending from within said primary separation chamber to an intermediate zone of said final separation chamber, said second passage extending from within said primary separation chamber from a point located a distance from the axis of said tube less than the radius of said tube immediately above said primary separation chamber.

3. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, and a second passage extending from within said primary separation chamber to an intermediate zone of said final separation chamber.

4. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, and a second passage extending from within said primary separation chamber to an intermediate zone of said final separation chamber, said second passage extending from within said primary separation chamber from a point located a distance from the axis of said tube less than the radius of said tube immediately above said primary separation chamber.

5. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, and a second passage extending from within said primary separation chamber to an intermediate zone of said final separation chamber, said intermediate zone constituting in substance the neutral zone of said final separation chamber.

6. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, a second passage extending from within said primary separation chamber to an intermediate zone of said final separation chamber, said intermediate zone constituting in substance the neutral zone of said final separation chamber, and said second passage extending from within said primary separation chamber from a point located a distance from the axis of said tube less than the radius of said tube immediately above said primary separation chamber.

7. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, a second passage extending from within said primary separation chamber to an intermediate zone of said final separation chamber, and a discharge port in the outer periphery of said final separation chamber.

8. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, a second passage extending from within said primary separation chamber to an intermediate zone of said final separation chamber, said second passage extending from within said primary separation chamber from a point located a distance from the axis of said tube less than the radius of said tube immediately above said primary separation chamber, and a discharge port in the outer periphery of said final separation chamber.

9. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, a second passage extending from within said primary separation chamber to an intermediate zone of said final separation chamber, said intermediate zone constituting in substance the neutral zone of said final separation chamber, and a discharge port in the outer periphery of said final separation chamber.

10. In a bowl for a centrifugal separator, the combination of, a hollow centrally positioned tube, a primary separation chamber at the lower end of said tube formed of an expanded portion of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, a second passage extending from within said primary separation chamber to an intermediate zone of said final separation chamber, said intermediate zone constituting in substance the neutral zone of said final separation chamber, said second passage extending from within said primary separation chamber from a point located a distance from the axis of said tube less than the radius of said tube immediately above said primary separation chamber, and a discharge port in the outer periphery of said final separation chamber.

11. In a bowl for a centrifugal separator, the combination of, a hollow centrally positioned tube, a primary separation chamber at the lower end of said tube, a final separation chamber surrounding said primary separation chamber and extending radially substantially beyond the outer periphery of said primary separation chamber, a first passage through the outer peripheral portion of said primary separation chamber to an outer zone of said final separation chamber, and a second passage extending from within said primary separation chamber to an intermediate zone of said final separation chamber.

12. In a bowl for a centrifugal separator, the combination of, a hollow centrally positioned tube, a primary separation chamber at the lower end of said tube, a final separation chamber surrounding said primary separation chamber and extending radially substantially beyond the outer periphery of said primary separation chamber, a first passage through the outer peripheral portion of said primary separation chamber to an outer zone of said final separation chamber, and a second passage extending from within said primary separation chamber to an intermediate zone of said final separation chamber, said second passage extending from within said primary separation chamber from a point located a distance from the axis of said tube less than the radius of said tube immediately above said primary separation chamber.

13. In a bowl for a centrifugal separator, the combination of, a hollow centrally positioned tube, a primary separation chamber at the lower end of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, and a second passage extending from within said primary separation chamber to an intermediate zone of said final separation chamber.

14. In a bowl for a centrifugal separator, the combination of, a hollow centrally positioned tube, a primary separation chamber at the lower end of said tube, a final separation chamber surrounding said primary separation chamber and extending radially substantially beyond the outer periphery of said primary separation chamber, a first passage through the outer peripheral portion of said primary separation chamber to an outer zone of said final separation chamber, said outer zone being spaced outwardly of the neutral zone of said final separation chamber, and a second passage extending from within said primary separation chamber to an intermediate zone of said final separation chamber, said second passage extending from within said primary separation chamber from a point located a distance from the axis of said tube less than the radius of said tube immediately above said primary separation chamber.

15. In a device of the type described for the centrifugal separation of material into lighter and heavier fractions of separation, the combination of a final outer rotary centrifugal separation chamber and a primary inner rotary centrifugal separation chamber, said chambers having a common axis of rotation, means for the introduction of material to be separated into the inner rotary centrifugal separation chamber, a first passage means for the passage of lighter fractions of the primarily separated material and unseparated heavier fractions of the material subjected to primary separation from said inner rotary centrifugal chamber into the outer rotary centrifugal chamber, a second passage means for the passage of heavier primarily separated fractions of the material from said inner rotary centrifugal chamber into said outer rotary centrifugal chamber, the entrance to said second passage means being positioned a greater radial distance from said axis of rotation than the entrance to said first passage means and radially beyond the radial depth of the space in said outer rotary centrifugal chamber normally occupied by the lighter fractions of separated material, and port means in the outer periphery of said outer rotary centrifugal separation chamber for the discharge of material therefrom, said port means being spaced from said axis of rotation a greater radial distance than the distance between said second passage and said axis of rotation.

16. In a device of the type described for the centrifugal separation of material into lighter and heavier fractions of separation, the combination of a final outer rotary centrifugal separation chamber and a primary inner rotary centrifugal separation chamber, said chambers having a common axis of rotation, means for the introduction of material to be separated into the inner rotary centrifugal separation chamber, a first passage means for the passage of material from the central portion of said inner chamber into a portion of said outer chamber, said portion of said outer chamber being located a radial distance from said axis of rotation substantially equal to the radial depth of the space normally occupied by the lighter fractions of separated material within said outer rotary centrifugal separation chamber, second passage means for the passage of material from the peripheral portion of said inner rotary centrifugal separation chamber into said outer rotary centrifugal separation chamber, the entrance to said second passage means being positioned a greater radial distance from said axis of rotation than the entrance to said first passage means, and a third passage means for passage of material through the outer periphery of said outer centrifugal chamber, said third passage means being of such a capacity as to permit the passage of only a portion of the heavier fractions of the separated materials therethrough.

17. In a device of the type described for the centrifugal separation and concentration of material into light, intermediate and heavy fractions of separation, the combination of a first outer rotary centrifugal separation chamber and a primary inner rotary centrifugal separation chamber, said chambers having a common axis of rotation, first means for the passage of light and primarily unseparated light, intermediate and heavy fractional components of the material from said inner centrifugal rotary chamber remote from the periphery thereof into said outer centrifugal rotary chamber, second means for the passage of heavy primarily separated fractions of the material from the outer peripheral portion of said inner rotary centrifugal chamber into said outer rotary centrifugal chamber, the entrance to said second means being positioned a greater radial distance from said axis of rotation than the entrance to said first means, and means for discharging light, intermediate and heavy fractions of separation from said outer rotary centrifugal chamber, the means for so discharging the heavy fraction of separation comprising a port positioned in a portion of said outer centrifugal chamber having the greatest diameter, said port and said second means being positioned radial distances from said axis of rotation greater than the radial depth of the space normally occupied by the lighter fractions of separation within said outer centrifugal separation chamber.

18. A device for the centrifugal separation of cream containing coagulated protein into light and intermediate and heavy fractions of separation comprising, in combination, a secondary centrifugal rotary separation chamber, discharge passage means in the wall of said secondary separation chamber positioned in the portion thereof having the greatest diameter, a primary centrifugal rotary separation chamber centrally positioned within said secondary separation chamber and adapted to rotate therewith and effect a primary concentration of coagulated protein therein, a plurality of centrally positioned stratifying disks within said secondary separation chamber said disk having distributing passages therethrough positioned at the neutral zone of said secondary separation chamber, flow passage means for the flow of cream through the wall of said primary separation chamber into said distributing passages, said flow passage means and said distributing passages being so arranged as to permit the flow of cream subjected to primary separation into the neutral zone of the spaces between said stratifying disks from within said primary separation chamber, the inner end of said flow passage means being positioned remotely from the periphery of said primary separation chamber, and port means for the passage of concentrated coagulated protein through the wall of said primary separation chamber, said port means being outwardly of said neutral zone and being so arranged as to permit the flow of primarily concentrated coagulated protein separately from the remainder of the cream out of said primary separation chamber to said discharge passage.

19. A device according to claim 18 in which one of said stratifying disks is so constructed and arranged as to obstruct the flow of the previously coagulated protein from said port to said discharge passage.

20. In a centrifugal separator for the separation and concentration of sour cream into coagulated protein, skim-milk and concentrated butter fat, a final centrifugal separation chamber for the final separation and concentration of sour cream into coagulated protein, skim-milk and concentrated butter fat, a primary centrifugal separation and concentration chamber for the primary separation and concentration of coagulated protein from sour cream, said primary separation and concentration chamber having a cream inlet and being positioned within said final separation chamber and adapted to rotate therewith, stratifying disks within said final separation chamber, a first coagulated protein discharge passage through the wall of said final separation chamber in a portion of the wall having the greatest diameter, skim-milk outlet and concentrated butter fat outlet in the upper wall of said final separation chamber, a cream discharge passage extending through the wall of said primary separation chamber and adapted to discharge cream which has been subjected to primary separation into the spaces between said stratifying disks at the neutral zone of said final centrifugal separation chamber from a portion of the interior of said primary separation chamber remote from the outer peripheral wall thereof, and a second coagulated protein discharge passage for discharging primarily separated and concentrated coagulated protein from the outer portions of said primary separation chamber into said final separation chamber at a point beyond the neutral zone of said final centrifugal separation chamber, said first coagulated protein passage being of such capacity as to permit the discharge therethrough of sufficient skim-milk portion of the separated sour cream as to aid in the discharge of coagulated protein from said final separation chamber through said first coagulated protein discharge passage.

21. The process in a centrifugal separator having primary and secondary rotary centrifugal separation chambers of centrifugally separating and concentrating cream containing coagulated protein, comprising the steps of subjecting the cream to primary centrifugal separation in the primary separation chamber sufficiently to separate and concentrate the readily separable coagulated protein from the remainder of the cream, discharging the primarily concentrated coagulated protein and the remainder of the primarily separated cream from the primary separation chamber into the secondary separation chamber, the concentrated coagulated protein being discharged from said primary separation chamber into said secondary separation chamber separately from the remainder of the primarily separated cream and into a zone of said secondary separation chamber outwardly of the neutral zone of said secondary separation chamber, subjecting the remainder of the primarily separated cream and the coagulated protein concentrate to secondary separation and further concentration separately within the secondary separation chamber, and discharging the secondarily concentrated coagulated protein from the zone of greatest centrifugal separation of the secondary separation chamber.

22. The process of clarifying a liquid containing extraneous matter in a centrifugal separator having primary and secondary separation chambers, comprising the steps of subjecting the liquid to primary centrifugal separation in the primary separation chamber sufficiently to concentrate the readily separable extraneous matter from the remainder of the liquid, discharging the concentrated readily separable extraneous matter and all of the remainder of the primarily separated liquid from the primary separation chamber into the secondary separation chamber, said concentrated extraneous matter being discharged from said primary separation chamber into said secondary separation chamber into a zone outwardly of the neutral zone of said secondary separation chamber and separately from the remainder of the primarily separated liquid, subjecting the remainder of the primarily separated liquid and the primarily separated extraneous matter to secondary separation and concentration separately within the secondary separation chamber, and discharging the secondarily concentrated extraneous matter from the zone of greatest centrifugal concentration of the secondary chamber.

INGIE J. LUNDAL.

REFERENCES CITED

The following references are of record in the file of this patent:

UNITED STATES PATENTS

| Number | Name | Date |
|---|---|---|
| 736,976 | Keiper | Aug. 25, 1903 |
| 1,754,774 | Sharples | Apr. 15, 1930 |
| 1,893,005 | Strezynski | Jan. 3, 1933 |
| 1,917,422 | Bergner | July 11, 1933 |
| 2,022,814 | Strezynski | Dec. 3, 1935 |
| 2,214,831 | Hall | Sept. 17, 1940 |

FOREIGN PATENTS

| Number | Country | Date |
|---|---|---|
| 120,421 | Austria | Dec. 27, 1930 |